C. SPRINGER.
WELDING TORCH.
APPLICATION FILED APR. 21, 1915.
1,159,119.
Patented Nov. 2, 1915.
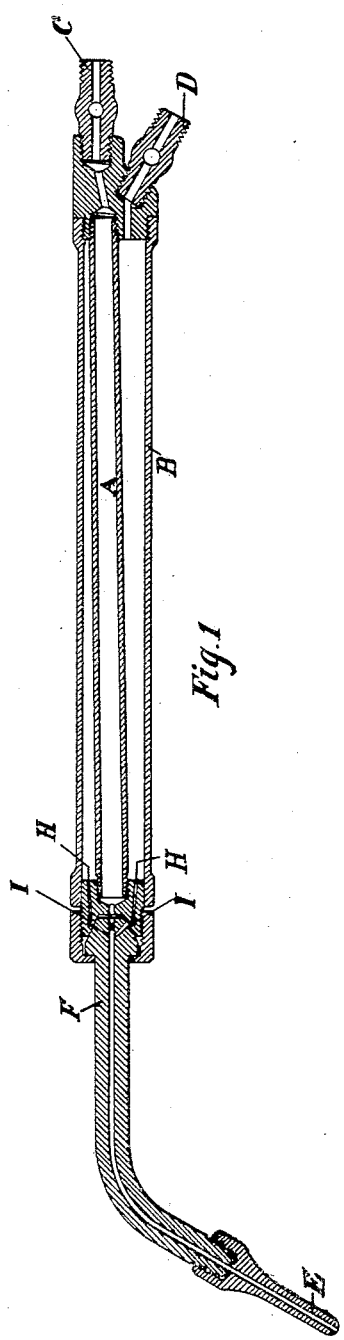
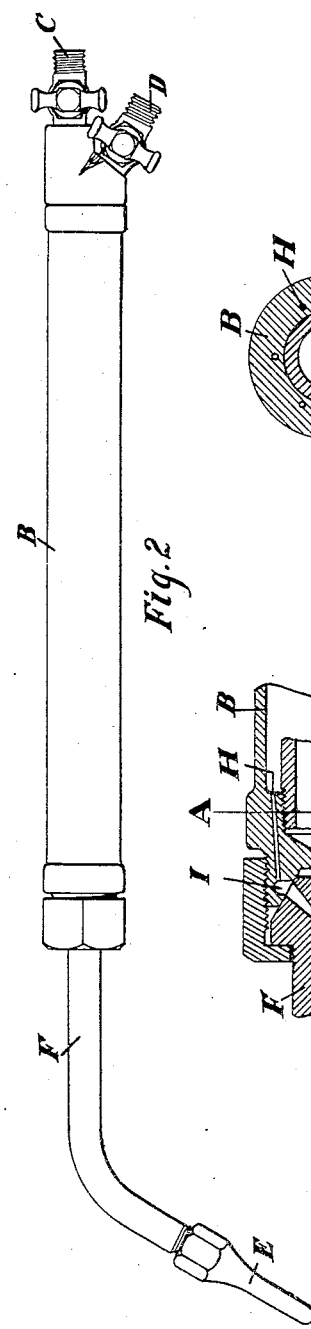
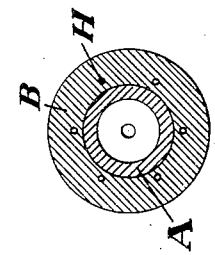
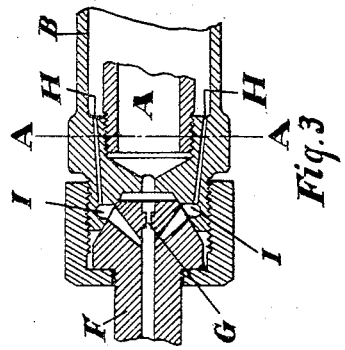
Witnesses
Minnie Montanye
Walter J. Ward
Inventor
Charles Springer
by Walter E. Ward
Atty.

UNITED STATES PATENT OFFICE.

CHARLES SPRINGER, OF ALBANY, NEW YORK.

WELDING-TORCH.

1,159,119.  Specification of Letters Patent.  Patented Nov. 2, 1915.

Application filed April 21, 1915. Serial No. 22,813.

*To all whom it may concern:*

Be it known that I, CHARLES SPRINGER, a citizen of the United States, residing at the city of Albany, in the county of Albany and State of New York, have invented certain new and useful Improvements in Welding-Torches, of which the following is a specification.

My invention relates to welding torches and the objects of my invention are to construct a welding torch by which the oxygen gas will flow through a tube located inside of the torch proper and the acetylene gas enter through a separate tube into the chamber formed by the outside shell or casing of the body of the torch inclosing the tube containing the oxygen gas and the acetylene gas will enter the neck of the nozzle from said chamber forming the body of the torch, the acetylene gas enters from the said chamber first into a secondary chamber formed by a groove at the end of the body of the torch where it is joined to the neck of the nozzle and flows through ports into the passage way in the neck and is mixed with oxygen gas in the neck of the nozzle, while the oxygen gas will enter said neck from the central tube and the mixture of the two gases in proper proportion is discharged through the nozzle for the purpose of fusing the metals together for welding purposes.

Other objects of my invention will appear from the specifications and drawings.

I accomplish these objects by means of the mechanism illustrated in the accompanying drawings, in which:—

Figure 1 is a longitudinal section of my welding torch showing the method of mixing the two gases. Fig. 2 is an elevation of the torch. Fig. 3 is an enlarged section of the mixing chamber showing the ports and passageways of the gases into the nozzle. Fig. 4 is a cross section of the torch upon line A—A, Fig. 3.

Similar letters refer to similar parts throughout the several views.

Referring to the drawings. A. represents a tube for supplying oxygen gas to the torch. The tube A. is much larger than the outlet through the neck to the nozzle, so as to produce a greater pressure and flow of gas through the nozzle than if the tube A. was of the same size as the outlet through the nozzle. Surrounding the tube A. is the outside shell or casing of the body of the torch proper, forming a chamber B. Into this chamber the acetylene gas is conducted from the source of supply by any suitable means.

C. is a valve for admitting oxygen gas into the tube A. and regulating the supply and flow of the oxygen gas, and D. is a valve for admitting acetylene gas into the chamber B., and for regulating the supply and flow of the acetylene gas.

E. is the nozzle through which the mixture of acetylene gas and oxygen gas is discharged upon the metals desired to be welded.

F. is a neck through which the mixture of acetylene gas and oxygen gas passes for discharge through the nozzle E.

G. is an obstruction or narrow opening in the neck F. through which the oxygen gas flows.

By referring to the drawings it will be seen that the tube A., into which the oxygen gas passes from the source of supply, empties directly into the passageway within the neck F. and the acetylene gas is discharged, through ports H, H from chamber B. into a secondary chamber formed by a groove I. in the end of the body of the torch and from said secondary chamber through tapering ports into the passageway of the neck F. The acetylene gas enters the passageway F. at a point nearer the nozzle than where the oxygen gas enters said passageway. The force of flow of the oxygen gas being greater than the force of flow of the acetylene gas the oxygen gas will tend to create a vacuum and carry along with it the acetylene gas and increase the force of flow of the mixture. The ports through which the acetylene gas flows from the secondary chamber into the neck are cone shaped. The inside of said ports being tapering, the smaller end at the point where the acetylene gas enters the passageway of the neck F.

The passageway in neck F. for the flow of the oxygen gas from tube A. to the nozzle E. is made smaller between the point where the neck F. connects with the tube A. and the point in said passage way where the acetylene gas enters said passage way by said cone shaped ports, as shown in Fig. 3.

The parts coming together forming the union of the body of the torch with the neck F. by which the passageway between tube A. and the passageway through the neck F. join each other for the flow of the oxygen gas into the nozzle and the ports for the flow of the acetylene gas from the secondary chamber into the passage way in the neck F. are ground smooth so as to make a tight joint. These parts are held together by a union nut so as to make a tight joint. By having this joint ground all leakage is removed and the necessity for washers is dispensed with. The ports are always open for the flow of gas through them.

Constructed in this way the flow of gas is always reliable and uniform and of great force, and being mixed as above described, the mixture, together with the force of the flow, will produce best results. The torch is also light in weight; the construction is simple, inexpensive and useful.

What I claim as my invention and desire to secure by Letters Patent, is—

1. In a welding torch having a nozzle, a tube adapted to contain oxygen gas; a casing surrounding said tube and forming a chamber adapted to contain acetylene gas; said casing, chamber and tube together forming the body of the torch; a neck connecting the body of the torch to the nozzle thereof adapted to permit the flow of gas there-through from the said tube to the nozzle of the torch; a secondary chamber at the end of the body of the torch; ports leading from said secondary chamber to the passage-way within the said neck of the torch; said ports being cone shaped with the smaller ends connecting with the passage-way in the neck of the torch.

2. In a welding torch having a nozzle, a tube adapted to contain oxygen gas; a casing surrounding said tube and forming a chamber adapted to contain acetylene gas; said casing, chamber and tube together forming the body of the torch; a neck connecting the body of the torch to the nozzle thereof adapted to permit the flow of gas there-through from the said tube to the nozzle of the torch; a secondary chamber at the end of the body of the torch; ports leading from said secondary chamber to the passage-way within the said neck of the torch; said ports being cone shaped with the smaller ends connecting with the passage-way in the neck of the torch; the passage way for the flow of gas through the neck of said torch being more contracted and narrower at a point between the inlet of oxygen gas into said passage-way from said tube and the inlet of acetylene gas into said passage-way from said ports than the other portions of said passage-way, substantially as described and for the purposes set forth.

In testimony whereof I affix my signature in presence of two witnesses.

CHARLES SPRINGER.

Witnesses:
WALTER J. WARD,
MINNIE MONTANYE.